United States Patent [19]

Watson et al.

[11] 4,063,221
[45] Dec. 13, 1977

[54] PROGRAMMABLE CALCULATOR

[75] Inventors: Robert E. Watson; Jack M. Walden; Charles W. Near, all of Loveland, Colo.

[73] Assignee: Hewlett-Packard Company, Palo Alto, Calif.

[21] Appl. No.: 535,750

[22] Filed: Dec. 23, 1974

Related U.S. Application Data

[62] Division of Ser. No. 153,437, June 15, 1971, Pat. No. 3,859,635.

[51] Int. Cl.² .................................................. G06F 7/38
[52] U.S. Cl. ................................ 364/900; 340/365 R; 364/706
[58] Field of Search .................... 340/172.5, 365 R; 445/1; 235/156

[56] References Cited

U.S. PATENT DOCUMENTS

| 3,492,658 | 1/1970 | Klett | 340/172.5 |
| 3,533,076 | 10/1970 | Perkins et al. | 340/172.5 |
| 3,593,297 | 7/1971 | Kadner | 340/172.5 |
| 3,760,171 | 9/1973 | Wang et al. | 340/172.5 |

*Primary Examiner*—Mark E. Nusbaum
*Attorney, Agent, or Firm*—Roland I. Griffin; William E. Hein

[57] ABSTRACT

A modular read-write and read-only memory unit capable of employing both direct and indirect decimal and symbolic addressing, a central processing unit capable of performing both serial binary and parallel binary-coded-decimal direct and indirect memory register arithmetic, and an input-output control unit capable of bidirectionally transferring information between the central processing unit a number of input and output units are controlled by a microprocessor included in the central processing unit. The input and output units include a keyboard input unit with a section capable of being defined by plug-in read-only memory modules and stored programs added by the user, a magnetic card reading and recording unit capable of bidirectionally transferring information between an external magnetic card and the calculator, and a solid state output display unit capable of displaying three lines of numeric information. An output printer unit capable of printing out every alphabetic and numeric character and many other symbols individually and in messages may also be included with the other input and output units.

The memory, central processing, input-output control, input, and output units are employed to provide an adaptable programmable calculator that may be operated manually by the user from the keyboard input unit or automatically by a program stored in the memory unit. This calculator may also be employed to load programs into the memory unit from the keyboard input unit, to separately transfer either data or programs bidirectionally between the memory unit and an external magnetic card, to code programs stored in the memory unit as being secure when they are transferred to an external magnetic card and thereby prevent users of the calculator from re-transferring them to an external magnetic card or obtaining any indication of the individual program steps once they are reloaded into the calculator, to edit programs stored in the memory unit and to print out keystroke logs, program lists, labels, and messages. The read-write memory available to the user may be expanded by the addition of program storage memory modules or by the alteration of the data storage memory control.

7 Claims, 7 Drawing Figures

PROGRAMMABLE CALCULATOR

CROSS REFERENCE TO RELATED APPLICATION

This is a division of application Ser. No. 153,437, filed June 15, 1971, now issued as U.S. Pat. No. 3,859,635 and incorporated herein by reference.

Background of the Invention

This invention relates generally to calculators and improvements therein and more particularly to programmable calculators that may be controlled both manually from the keyboard input unit and automatically by a stored program loaded into the calculator from the keyboard input unit or an external record member.

Conventional programmable calculators generally have less capability and flexibility than is required to meet the needs of many users. For example, they typically cannot be readily expanded and adapted by the user to separately increase the amount of program and data memory or to perform special keyboard functions oriented toward the environment of the user. They also typically cannot perform indirectly addressed numeric data register transfers and arithmetic without utilizing available working registers for addresses rather than data. This seriously limits their ability to efficiently perform complex operations such as file manipulations or matrix arithmetic. Moreover, they typically have a very limited capability for performing direct arithmetic between working and storage memory registers and little or no capability for performing indirect arithmetic between working and storage memory registers.

In some conventional programmable calculators a program stored within the calculator can be recorded onto an external magnetic record member and can later be reloaded back into the calculator from the magnetic record member. However, data and programs stored within these calculators typically cannot be separately recorded onto an external magnetic record member and later separately reloaded back into the calculator therefrom. Moreover, these calculators have no provision for making a program secure when it is recorded onto an external magnetic record member. Any user may therefore re-record the program or obtain an indication of the individual program steps once the program is reloaded into the calculator.

Conventional programmable calculators with self-contained output printer units typically have a very limited alpha capability of only a few selected characters confined to certain columns of the printer. They are therefore typically unable to print out both a numeric and a distinct mnemonic representation of every program step of every program stored within the calculator. Furthermore, they are typically unable to print out labels for inputs to and outputs from the calculator or messages informing the user how to run programs with which he may be unfamiliar. Such features would be very helpful to the user both in editing programs and in simplifying their use.

In some conventional programmable calculators a program stored within the calculator may be edited by single stepping forward through the program while viewing an output display representing the last-encountered program step and its associated address and, in one case, also the presently-encountered program step and its associated address. However, these calculators typically cannot single step backward through the program or display the next program step to be encountered and its associated address. Moreover, they typically have no provision for inserting program steps into the program without reloading portions of the program and no provision for finding every occurrence of any designated program step. Such features would also be very helpful to the user in editing programs.

Conventional computer systems have or may be programmed to have much more capability than conventional programmable calculators. However, they are larger, more expensive, and less efficient in calculating elementary mathematical functions than conventional programmable calculators. Moreover, a skilled programmer is typically required to utilize them. Due to these factors, conventional computer systems are best suited for handling large amounts of data or making highly iterative or very complex mathematical calculations.

SUMMARY OF THE INVENTION

The principal object of this invention is to provide an improved programmable calculator that has more capability and flexibility than conventional programmable calculators and that is smaller, less expensive, more efficient in calculating elementary mathematical functions, and easier to utilize than conventional computer systems.

Another object of this invention is to provide a programmable calculator in which the functions performed by the calculator may be readily expanded by the user and oriented toward the environment of the user and in which the added functions are automatically accommodated by the calculator.

Another object of this invention is to provide a programmable calculator in which the user may define keyboard functions to be performed by the calculator and may protect them from subsequently being inadvertently altered or destroyed.

These objects are accomplished according to the illustrated preferred embodiment of this invention by employing a keyboard input unit, a magnetic card reading and recording unit, a solid state output display unit, an output printer unit, an input-output control unit, a memory unit and a central processing unit to provide an adaptable programmable calculator having manual operating, automatic operating, program entering, magnetic card reading, magnetic card recording, and alphameric printing modes. The keyboard input unit includes a group of data keys for entering numeric data into the calculator, a group of control keys for controlling the various modes and operations of the calculator and the format of the output display, and a group of definable keys for controlling additional functions that may be added by the user. All of the data keys and nearly all of the control keys may also be employed for programming the calculator, many of the control keys being provided solely for this purpose. The keyboard input unit also includes a group of indicator lights for informing the user of the status of the calculator. These indicator lights and all of the keys are mounted on a front panel of a housing for the calculator.

The magnetic card reading and recording unit includes a reading and recording head, a drive mechanism for driving a magnetic card from an input receptacle in the front panel of the calculator housing past the reading and recording head to an output receptacle in the front panel, and reading and recording drive circuits coupled to the reading and recording head for bidirectionally transferring information between the magnetic card and the calculator as determined by the control keys of the keyboard input unit. It also includes a pair of detectors and an associated control circuit for disabling the recording drive circuit whenever a notch is detected in the leading edge of the magnetic card to prevent information recorded on the magnetic card from being inadvertently destroyed. Such a notch may be provided in any magnetic card the user desires to protect by simply pushing out a perforated portion thereof.

The solid state output display unit includes three rows of light emitting diode arrays and associated drive circuits for selectively displaying three separate lines of numeric information. Numeric data may be displayed in either a fixed or a floating point format as determined by the control keys of the keyboard input unit.

The output printer unit includes a stationary thermal printing head with a row of resistive heating elements, a drive circuit for selectively energizing each heating element, and a stepping mechanism for driving a strip of thermal-sensitive recording paper past the stationary thermal printing head in seven steps for each line of alphameric information to be printed out. Every alphabetic and numeric character and many other symbols may be printed out individually or in messages as determined by the control keys of the keyboard input unit or by a program stored within the calculator.

The input-output control unit includes a sixteen-bit universal shift register serving as an input-output register into which information may be transferred serially from the central processing unit or in parallel from the keyboard input and magnetic card reading and recording units and from which information may be transferred serially to the central processing unit or in parallel to the keyboard indicator lights and to the solid state output display, magnetic card reading and recording, and output printer units. It also includes control logic responsive to the central processing unit for controlling the transfer of information between these units. The input-output control unit may also be employed to perform the same functions between the central processing unit and peripheral units including, for example, a digitizer, a marked card reader, an X-Y plotter, a magnetic tape unit, and a typewriter. A plurality of peripheral units may be connected at the same time to the input-output control unit by simply plugging interface modules associated with the selected peripheral units into receptacles provided therefore in a rear panel of the calculator housing.

The memory unit may employ both direct and indirect decimal and symbolic addressing. It includes a modular random-access read-write memory having a program storage section for storing a plurality of program steps and having a separate data storage section including a plurality of working registers, a plurality of associated display registers, and a plurality of storage registers for manipulating and storing data. These program and data storage sections of the read-write memory may be separately expanded without increasing the overall dimensions of the calculator by the addition of program storage modules or by the alteration of the data storage memory control. Additional read-write memory made available to the user is automatically accommodated by the calculator, and the user is automatically informed when the program or data storage capacity of the read-write memory has been exceeded.

The memory unit also includes a modular read-only memory in which routines and subroutines of basic instructions for performing the various functions of the calculator are stored. These routines and subroutines of the read-only memory may be expanded and adapted by the user to perform additional functions oriented toward the specific needs of the user. This is accomplished by simply plugging additional read-only memory modules into receptacles provided therefor in the top panel of the calculator housing. Added read-only memory modules are automatically accommodated by the calculator and may be associated with the definable keys of the keyboard input unit or employed to expand the operations associated with other keys. An overlay is employed with each added read-only memory module associated with the definable keys of the keyboard input unit to identify the additional functions that may then be performed by the calculator.

Plug-in read-only memory modules including, for example, an alpha module, a mathematics module, a statistics module, a definable functions module, and a typewriter module may be added to the read-only memory. The alpha module enables the calculator to print out every alphabetic character individually or in messages. It employs addressing enabling it to redefine most of the keys of the keyboard input unit so that it may be employed at the same time as other plug-in read-only memory modules. The mathematics module enables the calculator to perform trigonometric functions, coordinate transformations, vector arithmetic, and many other mathematical functions. Similarly, the statistics module enables the calculator to perform random number generations, accumulations of sums, sums of products and sums of squares for up to five variables, linear and multiple linear regressions, and many other statistical functions. It also permits the use of a correct key, included among the definable keys of the keyboard input unit, to automatically delete data from a statistical analysis. The definable functions module enables the user to store programs of his own choosing in the program storage section of the read-write memory, associate them with some of the definable keys of the keyboard input unit, and protect them from subsequently being inadvertently altered or destroyed. It also permits the use of an insert key and a find key, included among the definable keys of the keyboard input unit, to insert program steps in a program stored in the read-write memory and to find every occurrence of any designated program step in the stored program. The typewriter module enables the calculator to control the entire keyboard of a properly interfaced typewriter.

The memory unit further includes a pair of recirculating sixteen-bit serial shift registers. One of these registers serves as a memory address register for serially receiving information from an arithmetic-logic unit included in the central processing unit, for parallel addressing any memory location designated by the received information, and for serially transferring the received information back to the arithmetic-logic unit. The other of these registers serves as a memory access register for serially receiving information from the arithmetic-logic unit, for writing information in parallel into any addressed memory location, for reading information in parallel from any addressed memory location, and for serially transferring information to the arithmetic-logic unit. It also serves as a four-bit parallel shift register for transferring four bits of binary-coded-decimal information in parallel to the arithmetic-logic unit.

The central processing unit includes four recirculating sixteen-bit serial shift registers, a four-bit serial shift register, the arithmetic logic unit, a programmable clock, and a microprocessor. Two of these sixteen-bit serial shift registers serve as accumulator registers for serially receiving information from and serially transferring information to the arithmetic-logic unit. The accumulator register employed is designated by a control flip-flop. One of the accumulator registers also serves as a four-bit parallel shift register for receiving four bits of binary-coded-decimal information in parallel from and transferring four bits of such information in parallel to the arithmetic-logic unit. The two remaining sixteen-bit serial shift registers serve as a program counter register and a qualifier register, respectively. They are also employed for serially receiving information from and serially transferring information to the arithmetic-logic unit. The four-bit serial shift register serves as an extend register for serially receiving information from either the memory access register or the arithmetic-logic unit and for serially transferring information to the arithmetic-logic unit.

The arithmetic-logic unit is employed for performing one-bit serial binary arithmetic, four bit-parallel binary-coded-decimal arithmetic, and logic operations. It may also be controlled by the microprocessor to perform bidirectional direct and indirect arithmetic between any of a plurality of the working registers and any of the storage registers of the data storage section of the read-write memory.

The programmable clock is employed to supply a variable number of shift clock pulses to the arithmetic-logic unit and to the serial shift registers of the input-output, memory, and central processing units. It is also employed to supply clock control signals to the input-output control logic and to the microprocessor.

The microprocessor includes a read-only memory in which a plurality of microinstructions and codes are stored. These microinstructions and codes are employed to perform the basic instructions of the calculator. They include a plurality of coded and non-coded microinstructions for transferring control to the input-output control logic, for controlling the addressing and accessing of the memory unit, and for controlling the operation of the two accumulator registers, the program counter register, the extend register and the arithmetic-logic unit. They also include a plurality of clock codes for controlling the operation of the programmable clock, a plurality of qualifier selection codes for selecting qualifiers and serving as primary address codes for addressing the read-only memory of the microprocessor, and a plurality of secondary address codes for addressing the read-only memory of the microprocessor. In response to a control signal from a power supply provided for the calculator, control signals for the programmable clock, and qualifier-control signals from the central-processing and input-output control units, the microprocessor issues the microinstructions and codes stored in the read-only memory of the microprocessor as required to process either binary or binary-coded-decimal information entered into or stored in the calculator.

In the manual operating mode, the calculator is controlled by keycodes sequentially entered into the calculator from the keyboard input unit by the user. The solid state output display unit displays a numeric representation of the contents of three of the working registers and their associated display registers. These working registers and their associated display registers may contain the last-entered numeric operand and two previously entered or calculated numeric operands or results or three previously entered or calculated numeric operands or results. The output printer unit may be controlled by the user to selectively print out a numeric representation of any numeric data entered into the calculator from the keyboard input unit, a numeric representation of any result calculated by the calculator, and a mark distinguishing numeric data entries from calculated numeric results. If the alpha read-only memory module is plugged into the calculator, the output printer unit may also be controlled by the user to print out labels for inputs to and outputs from the calculator and any other alphabetic information that may be desired.

When the calculator is in the manual operating mode, it may also be operated in a key-log alphameric printing mode. The output printer unit then prints out a numeric representation of each keycode as it is entered by the user. If the alpha read-only memory module is plugged into the calculator, the output printer unit also prints out a mnemonic representation of each such keycode.

In the automatic operating mode, the calculator is controlled by automatically obtaining keycodes stored as steps of a program in the program storage section of the read-write memory. During automatic operation of the calculator, data may be obtained from the memory unit as designated by the program or may be entered from the keyboard input unit by the user while the operation of the calculator is stopped for data either by the program or by the user. The solid state output display unit displays the final contents of the three working registers and their associated display registers. This may include the final calculated numeric result and two previously entered or calculated numeric operands or results or three previously entered or calculated numeric operands or results. The output printer unit prints out calculated numeric results and other numeric information designated by the program. If the alpha read-only memory module is plugged into the calculator, the output printer unit also prints out any alphabetic information designated by the program.

When the calculator is in the automatic operating mode, the user may also employ a step program control key of the keyboard input unit to single step forward through the program being executed. This enables the user to check the execution of the program step by step in order to determine whether the program, as entered into the calculator, does in fact carry out the desired sequence of operations.

In the program entering mode, keycodes are sequentially entered by the user into the calculator from the keyboard input unit and are stored as steps of a program in the program storage section of the read-write memory. The program may include sequences of program steps that will be interpreted, when the program is executed, as alphabetic information to be printed out by the output printer unit if the alpha read-only memory module is plugged into the calculator. This alphabetic information may include labels for inputs to and outputs from the calculator, alphabetic messages for facilitating the use of the program and the operation of the calculator, or any other alphabetic information that may be desired. While the user is entering a program into the calculator in the program entering mode, the solid state output display unit displays a numeric representation of the last-entered program step and its associated address and the addresses of the next two program steps to be entered and the present contents of those addresses.

In the program entering mode, the user may also employ the step program control key and a back step control key of the keyboard input unit, to single step either forward or backward through any sequence of program steps stored in the program storage section of the read-write memory. While the user is single stepping forward or backward through a sequence of program steps, the solid state output display unit displays a numeric representation of the last-encountered program step, the program step presently encountered, the next program step to be encountered, and the addresses of these program steps. If the definable functions read-only memory module is plugged into the calculator, the user may also employ the insert and find keys described above by switching to the manual operating mode. These features greatly facilitate the editing of programs stored in the program storage section of the read-write memory.

When the calculator is in the program entering mode, it may also be operated in a key-log alphameric printing mode. The output printer unit then prints out a numeric representation of each program step and its associated address as it is entered into the calculator from the keyboard input unit by the user. If the alpha read-only memory module is plugged into the calculator, the output printer unit also prints out a mnemonic representation of each such program step.

When the calculator is in the program entering mode, it may also be operated in a list alphameric printing mode. The output printer unit then prints out a numeric representation of every program step then stored in the program storage section of the read-write memory and a numeric representation of the addresses of those program steps. If the alpha read-only memory module is plugged into the calculator, the output printer unit also prints out a mnemonic representation of each such program step.

DESCRIPTION OF THE DRAWINGS

The following figures have been numbered in correspondence with the same figures of U.S. Pat. No. 3,859,635, cited above as being incorporated herein by reference.

DESCRIPTION OF THE PREFERRED EMBODIMENT

GENERAL DESCRIPTION

Figure 1:
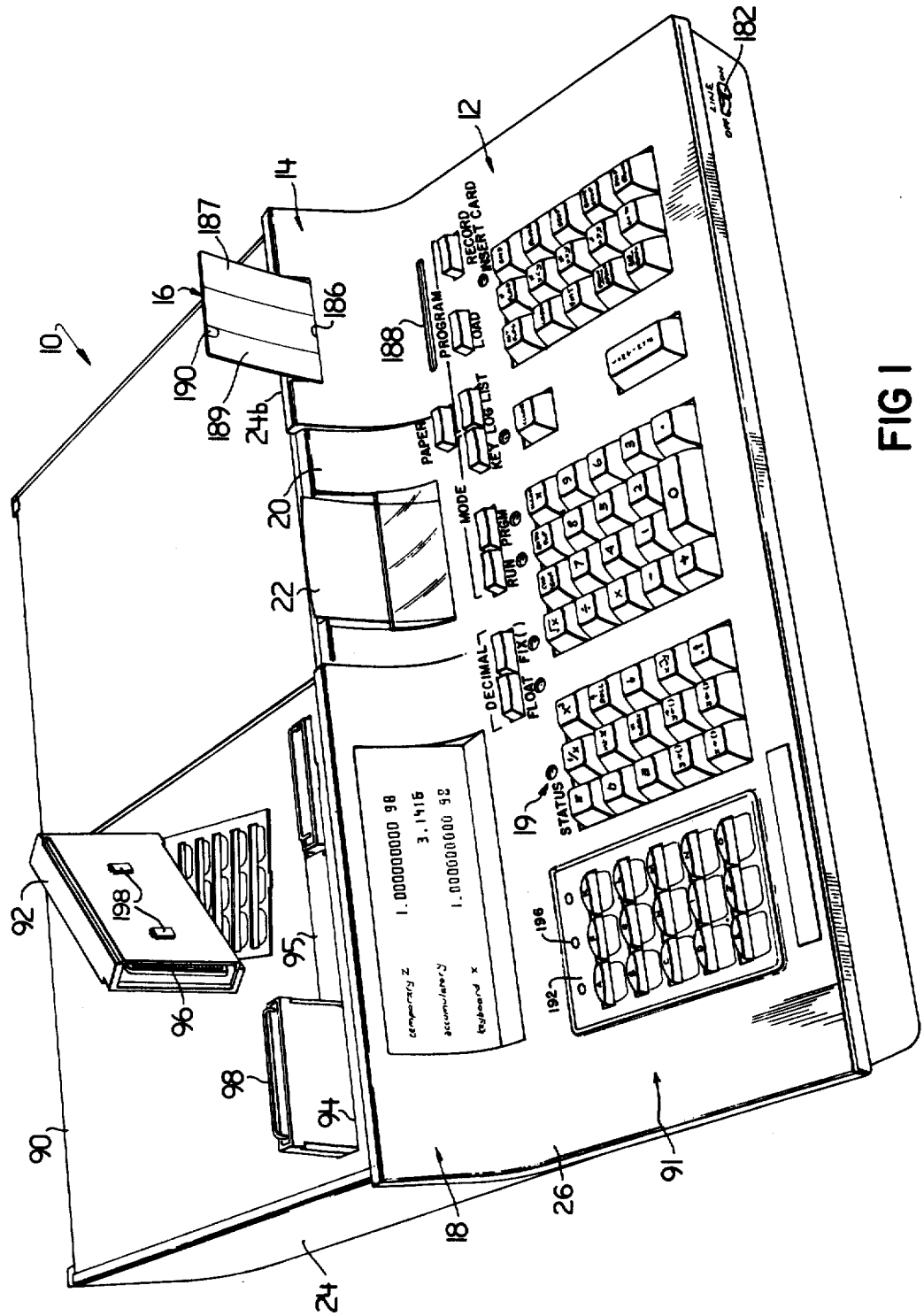
FIG. 1 is a front perspective view of an adaptable programmable calculator according to the preferred embodiment of this invention.

Referring to FIG. 1, there is shown an adaptable programmable calculator 10 including both a keyboard input unit 12 for entering information into and controlling the operation of the calculator and a magnetic card reading and recording unit 14 for recording information stored within the calculator onto one or more external magnetic cards 16 and for subsequently loading the information recorded on these and other similar magnetic cards back into the calculator. The calculator also includes a solid state output display unit 18 for displaying three lines of numeric information stored within the calculator and a group of indicator lights 19, serving as part of the keyboard input unit, for indicating the status of the calculator. It may also include an output printer unit 20 for printing out alphameric information on a strip of thermally sensitive recording paper 22. All of these input and output units are mounted within a single calculator housing 24 adjacent to a curved front panel 26 thereof.

Figure 3A:
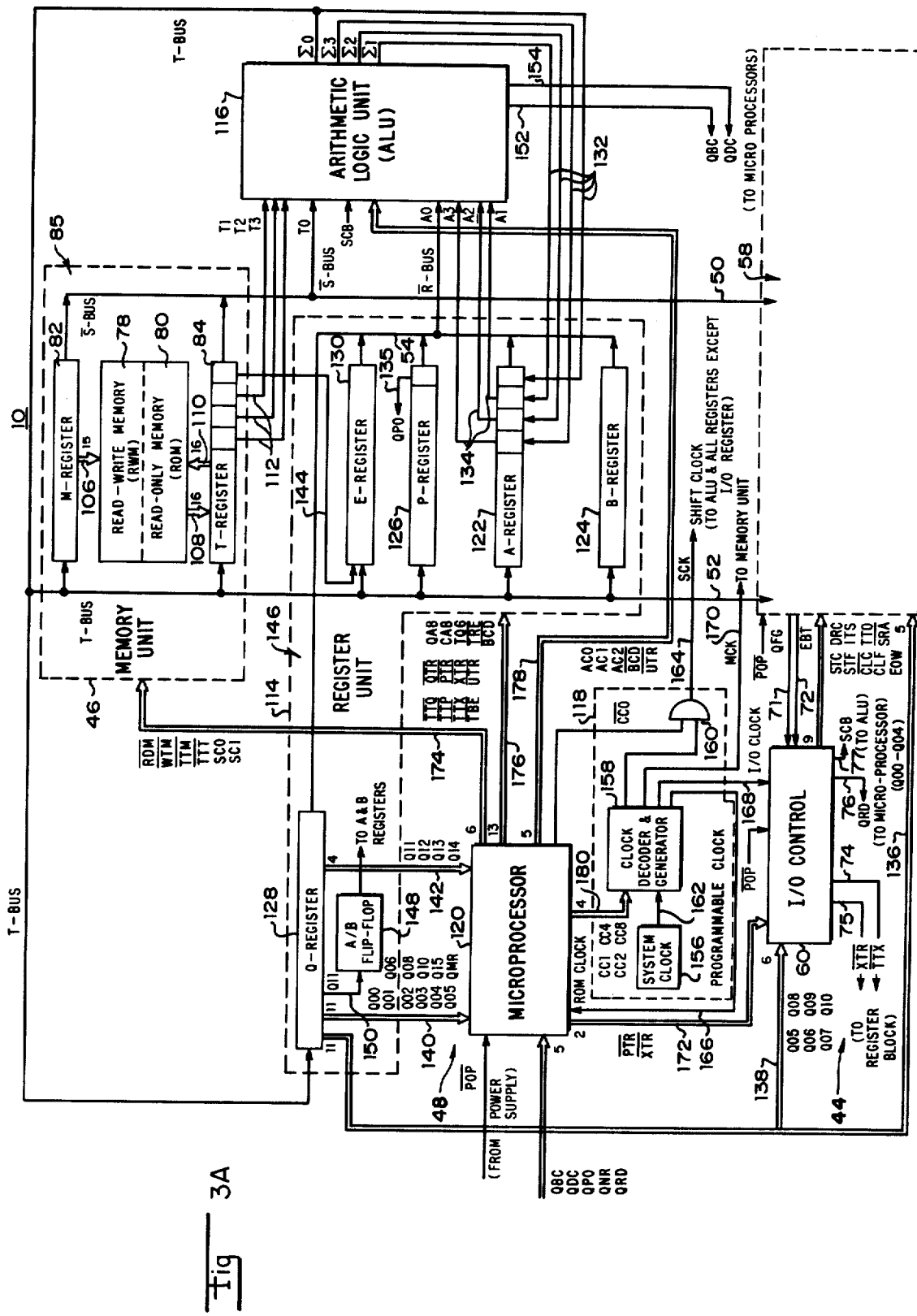
FIGS. 3A-B are simplified block diagram of the adaptable programmable calculator of FIG. 1.
Figure 3B:
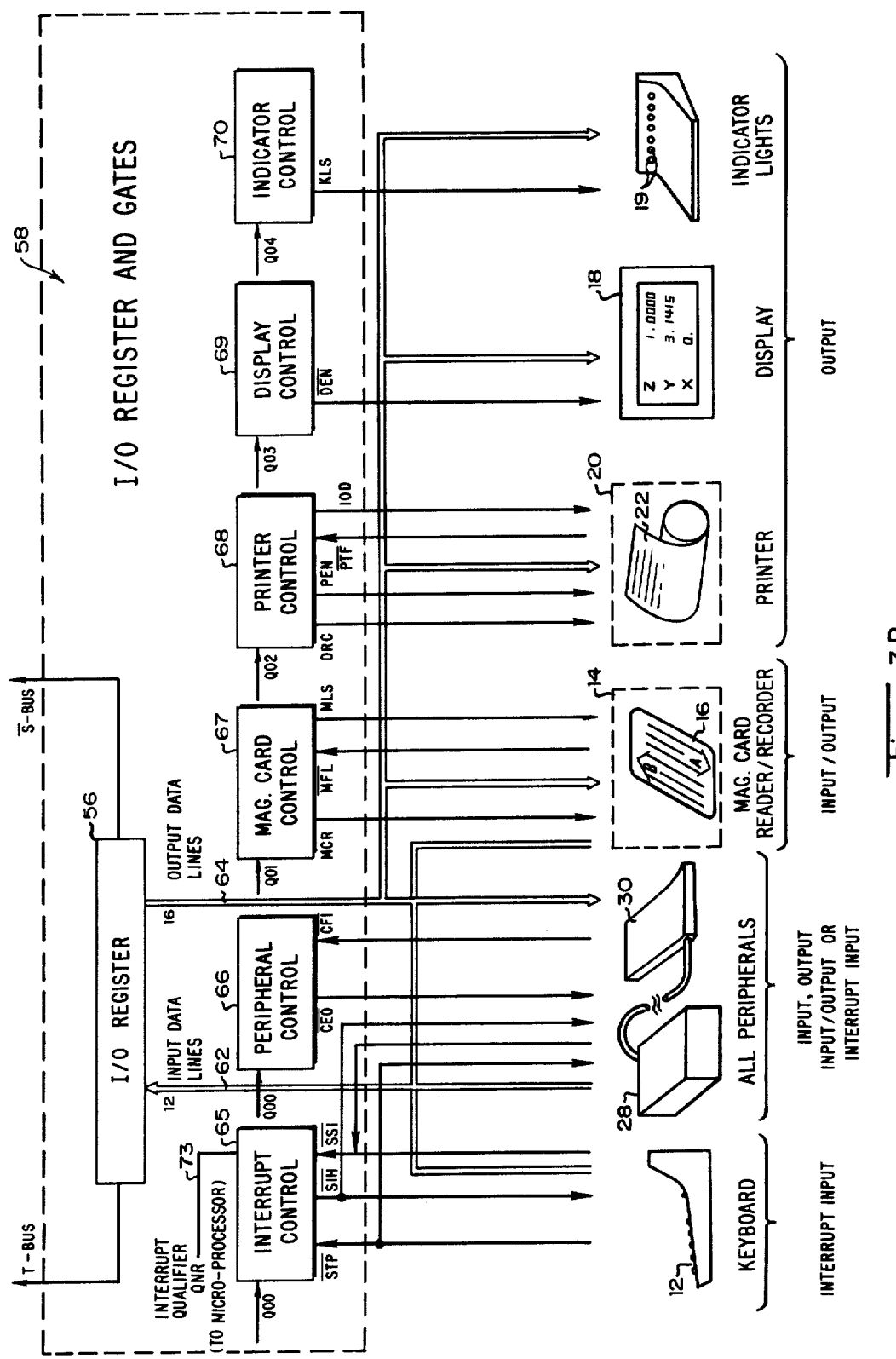
Figure 8:
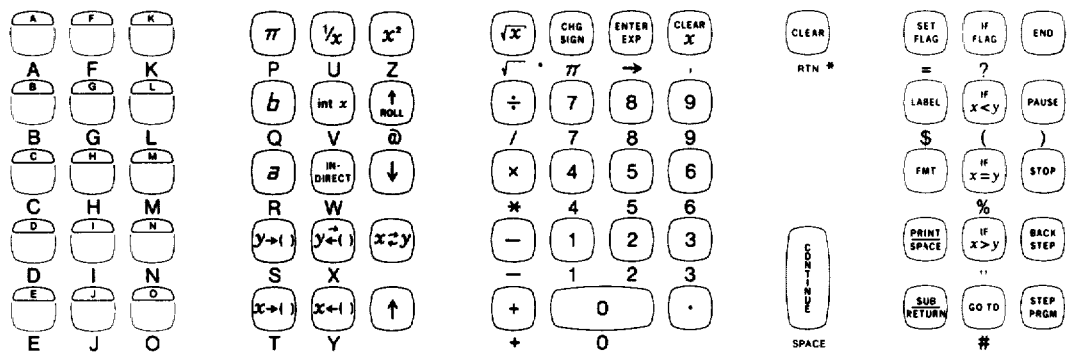
FIG. 8 is a plan view of the keyboard input unit employed in the adaptable programmable calculator of FIGS. 1 and 3A-B showing how the keyboard input unit may be redefined by an alpha plug-in read-only memory module that may also be employed in the adaptable programmable calculator.

Referring to the simplified block diagram shown in FIGS. 3A-B, it may be seen that the calculator also includes an input-output control unit 44 (hereinafter referred to as the I/O control unit) for controlling the transfer of information to and from the input and output units, a memory unit 46 for storing and manipulating information entered into the calculator and for storing routines and subroutines of basic instructions performed by the calculator, and a central processing unit 48 (hereinafter referred to as the CPU) for controlling the execution of the routines and subroutines of basic instruction stored in the memory unit as required to process information entered into or stored within the calculator. The calculator also includes a bus system comprising an S-bus 50, a T-bus 52, and an R-bus 54 for transferring information from the memory and I/O control units to the CPU, from the CPU to the memory and I/O control units, and between different portions of the CPU. It further comprises a power supply for supplying DC power to the calculator and peripheral units employed therewith and for issuing a control signal POP when power is supplied to the calculator.

The I/O control unit 44 includes an input-output register 56 (hereinafter referred to as the I/O register), associated I/O gating control circuitry 58, and input-output control logic 60 (hereinafter referred to as the I/O control). I/O register 56 comprises a universal sixteen-bit shift register into which information may be transferred either bit-serially from CPU 48 via T-bus 52 or in parallel from keyboard input unit 12, magnetic card reading and recording unit 14, and peripheral input units 28 such as the marked card reader via twelve input party lines 62. Information may also be transferred from I/O register 56 either bitserially to CPU 48 via S-bus 50 or in parallel to magnetic card reading and recording unit 14, solid state output display unit 18, indicator lights 19, output printer unit 20, and peripheral output units 28 such as the X-Y plotter or the typewriter via sixteen output party lines 64.

I/O gating control circuitry 58 includes control circuits for controlling the transfer of information into and out of I/O register 56 in response to selected I/O qualifier control signals from CPU 48 and selected I/O control instructions from I/O control 60. It also includes an interrupt control circuit 65, a peripheral control circuit 66, a magnetic card control circuit 67, a printer control circuit 68, a display control circuit 69, and an indicator control circuit 70 for variously controlling the input and output units and issuing control signals QFG and EBT to I/O control 60 via two output lines 71 and 72. These last mentioned control circuits variously perform their control functions in response to control signal $\overline{POP}$ from the power supply, I/O qualifier control signals from CPU 48, I/O control instructions from I/O control 60, and control signals from keyboard input unit 12. Interrupt control circuit 65 initiates the transfer of information into I/O register 56 from keyboard input unit 12 or interrupting peripheral input units 28 such as the marked card reader and issues a qualifier control signal QNR to CPU 48 via output lines 73. Peripheral control circuit 66 enables interface modules 30 plugged into the calculator to respond to information from I/O register 56, control associated peripheral units 28, transfer information to and/or receive information from associated peripheral units 28, and in some cases initiate the transfer of information to I/O register 56 from the interface modules themselves. Magnetic card control circuit 67 enables magnetic card reading and recording unit 14 to respond to information in I/O register 56 and either read information into I/O register 56 from a magnetic card 16 or record information onto a magnetic card 16 from I/O register 56. Printer control circuit 68, display control circuit 69, and indicator control circuit 70 enable output display unit 18, output printer unit 20, and indicator lights 19, respectively, to respond to information from I/O register 56.

When a basic I/O instruction obtained from memory unit 46 is to be executed, CPU 48 transfers control to I/O control 60 by issuing a pair of I/O microinstructions $\overline{PTR}$ and $\overline{XTR}$ thereto. In response to these I/O microinstructions from CPU 48, control signal $\overline{POP}$ from the power supply, control signals QFG and EBT from I/O gating control circuitry 58, and I/O qualifier and clock control signals from CPU 48, I/O control 60 selectively issues one or more I/O control instructions to gating control circuitry 58 as required to execute the basic I/O instruction designated by CPU 48 and issues control signals $\overline{TTX}$, $\overline{XTR}$, QRD, and SCB to CPU 48 via output lines 74–77. The I/O qualifier control signals issued to I/O control 60 and gating control circuitry 58 by CPU 48 are derived from the basic I/O instruction to be executed. Those qualifier control signals issued to I/O control 60 designate the specific I/O control instructions to be issued by I/O control 60, while those issued to gating control circuitry 58 designate selected control circuits to be employed in executing the basic I/O instruction.

Memory unit 46 includes a modular random-access read-write memory 78 (hereinafter referred to as the RWM), a modular read-only memory 80 (hereinafter referred to as the ROM), a memory address register 82 (hereinafter referred to as the M-register), a memory access register 84 (hereinafter referred to as the T-register), and control circuitry 85 for these memories and registers. RWM 78 and ROM 80 comprise MOS-type semiconductor memories.

Referring again to FIGS. 3A–B, M-register 82 of the memory unit comprises a recirculating sixteen-bit serial shift register into which information may be transferred bit-serially from CPU 48 via T-bus 52 and out of which information may be transferred bit-serially to CPU 48 via S-bus 50. Information shifter into M-register 82 may be employed to address any word in RWM 78 or ROM 80 via fifteen output lines 106.

T-register 84 of the memory unit comprises a recirculating sixteen-bit serial shift register into which information may be transferred either bit-serially from CPU 48 via T-bus 52 or in parallel from any addressed word in RWN 78 and ROM 80 via sixteen parallel input lines 108. Information may be transferred from T-register 104 either bit-serially to CPU 48 via $\overline{S}$-bus 50 or in parallel to any addressed word in RWM 78 via sixteen parallel output lines 110. The four least significant bits of information contained in T-register 104 may comprise binary-coded-decimal information and may be transferred from the T-register in parallel to CPU 48 via three parallel output lines 112 taken with $\overline{S}$-bus 50.

The control circuitry 85 of the memory unit controls these transfers of information into and out of M-register 82 and T-register 84, controls the addressing and accessing of RWM 78 and ROM 80, and refreshes RWM 78. It performs these functions in response to memory microinstructions, memory clock pulse, and shift clock pulses from CPU 48.

CPU 48 includes a register unit 114, an arithmetic-logic unit 116 (hereinafter referred to as the ALU), a programmable clock 118, and a microprocessor 120. Register unit 114 comprises four recirculating sixteen-bit shift registers 122, 124, 126, and 128 and one four-bit shift register 130. Shift registers 122 and 124 serve as sixteen-bit serial accumulator registers (hereinafter referred to as the A-register and the B-register, respectively) into which information may be transferred bit-serially from ALU 116 via T-bus 52 and out of which information may be transferred bit-serially to ALU 116 via $\overline{R}$-bus 54. The four least significant bit positions of A-register 122 also serve as a four-bit parallel accumulator register into which four bits of binary-coded-decimal information may be transferred in parallel from ALU 116 via four parallel input lines 132 and out of which four bits of binary-coded-decimal information may also be transferred in parallel to ALU 116 via three parallel output lines 134 taken with $\overline{R}$-bus 54.

Shift register 126 serves as a sixteen-bit system program counter (hereinafter referred to as the P-register) into which information may be transferred bit-serially from ALU 116 via T-bus 52 and out of which information may be transferred bit-serially to ALU 116 via $\overline{R}$-bus 54. Information contained in the least significant bit position of P-register 126 may also be tranferred as a qualifier control signal QPO to microprocessor 120 via output line 135.

Shift register 128 serves as a sixteen-bit qualifier register (hereinafter referred to as the Q-register) into which information may be transferred bit-serially from ALU 116 via T-bus 52 and out of which information may be transferred bit-serially to ALU 116 via $\overline{R}$-bus 54. Information contained in the five least-significant bit positions of Q-register 128 is transferred to I/O gating control circuitry 58 as five one-bit I/O qualifier control signals Q00-Q04 via five parallel output lines 136, and information contained in the six next-least-significant bit positions of the Q-register is transferred to I/O control 60 as six one-bit I/O qualifier control signals Q05-Q10 via six parallel output lines 138. Similarly, information contained in the seven least-significant, the ninth and eleventh least-significant, and the most-significant bit positions of Q-register 128 and information derived from the thirteenth, fourteenth, and fifteenth bit positions of the Q-register may be transferred to microprocessor 120 as eleven one-bit microprocessor qualifier control signals Q00-Q06, Q08, Q10, Q15, and QMR via eleven output lines 140. Information contained in the twelfth through the fifteenth least-significant bit positions of Q-register 128 may be transferred to microprocessor 120 as a four-bit primary address code via four parallel output lines 142.

Shift register 130 serves as a four-bit serial extend register (hereinafter referred to as the E-register) into which information may be transferred bit-serially either from ALU 116 via T-bus 52 or from the least-significant bit position of T-register 84 via input line 144. Information may also be transferred out of E-register 130 to ALU 116 via $\overline{R}$-bus 54.

Register unit 114 also includes control circuitry 146 for controlling the transfer of parallel binary-coded-decimal information into and out of A-register 122 and the transfer of serial binary information into and out of A-register 122, B-register 124, P-register 126, Q-register 128, and E-register 130. This is accomplished in response to register microinstructions from microprocessor 120, control signals $\overline{TTX}$ and $\overline{XTR}$ from I/O control 60, and shift clock control pulses from programmable clock 118. Control circuitry 146 includes a flip-flop 148 (hereinafter referred to as the A/B flip-flop) for enabling the transfer of information into and out of either the A-register 122 or the B-register 124 as determined by the state of the A/B flip-flop. The state of A/B flip-flop 148 is initially determined by information Q11 transferred to the A/B flip-flop from the twelfth least-significant bit position of Q-register 128 but may be subsequently complemented one or more times by microinstruction CAB from microprocessor 120.

ALU 116 may perform either one-bit serial binary arithmetic on data received from T-register 84 or M-register 82 via $\overline{S}$-bus 50 and/or from any register of register unit 114 via $\overline{R}$-bus 54 or four-bit parallel binary-coded-decimal arithmetic on data received from T-register 84 via output lines 112 taken with $\overline{S}$-bus 50 and/or from A-register 122 via output lines 134 taken with $\overline{R}$-bus 54. It may also perform logic operations on data received from memory unit 46 and/or register unit 114 via any of these lines. The arithmetic and logic operations performed are designated by ALU microinstructions from microprocessor 120 and are carried out in response to these microinstructions, shift clock control pulses from programmable clock 118, and control signal SCB from I/O control 60. Information is also transferred from ALU 116 to A-register 122 via output lines 132 or to I/O register 56, M-register 82, T-register 84, or any register of register unit 114 via T-bus 52 in response to microinstructions and control signals applied to these registers. If a carry results while ALU 116 is performing either one-bit serial binary arithmetic or four-bit parallel binary-coded-decimal arithmetic, the ALU issues a corresponding qualifier control signal QBC and QDC to microprocessor 120 via one of two output lines 152 and 154.

Programmable clock 118 includes a crystal-controlled system clock 156, a clock decoder and generator 158, and a control gate 160. System clock 156 issues regularly recurring clock pulses to clock decoder and generator 158 via output line 162. In response to these regularly recurring clock pulses from system clock 156 and to four-bit clock codes from microprocessor 120, clock decoder and generator 158 issues trains of $n$ shift clock pulses to ALU 116, M-register 82, T-register 82, and all of the registers of register unit 114 via output line 164. These trains of $n$ shift clock pulses are employed for shifting a corresponding number of bits of serial information into or out of any of these registers or for shifting a carry bit in the ALU. The number $n$ of pulses in each of these trains may vary from one to sixteen as determined by the number of bits of serial information required during each operation to be performed. In response to a control signal $\overline{CCO}$ from microprocessor 120, control gate 160 prevents any shift clock pulses from being applied to the ALU or any of these registers. Upon completion of each train of $n$ shift clock pulses, clock decoder and generator 158 issues of ROM clock pulse to microprocessor 120 via output line 166 and an I/O clock pulse to I/O control 60 via output line 168. In response to the regularly recurring clock signal from system clock 56, clock decoder and generator 158 also issues correspondingly regularly recurring memory clock pulses to memory unit 46 via output line 170.

Microprocessor 120 selectively issues two I/O microinstructions to I/O control 60 via two output lines 172, six memory microinstructions to memory unit 46 via six output lines 174, thirteen register microinstructions to register unit 114 via thirteen output lines 176, and five ALU microinstructions to ALU 116 via five output lines 178. It also issues a four-bit clock code associated with each of these microinstructions to clock decoder 158 via four output lines 180. These microinstructions and associated clock codes are issued as determined by the control signal $\overline{POP}$ from the power supply, the eleven microprocessor qualifier control signals from Q-register 128, the four-bit primary address codes from Q-register 128, and the five microprocessor qualifier control signals from I/O control 60, interrupt control 65, ALU 116, and P-register 126.

KEY OPERATIONS

All operations performed by the calculator may be controlled or initiated by the keyboard input unit and/or by keycodes entered into the calculator from the keyboard input unit, the magnetic card reading and recording unit, or peripheral input units such as the marked card reader and stored as program steps in the program storage section of the RWM. The calculator responds to keycodes in basically the same manner whether obtaining them from the keyboard input unit or from the program storage section of the RWM. An operational description of the keyboard input unit is therefore now given with specific reference to FIGS. 1 and 8-11.

DEFINABLE AND REDEFINABLE KEYS

The half keys A-O comprising the group of definable keys 91 enable the calculator to be tailored to the special needs of the user. Operation of these keys is defined by the various plug-in ROM modules 92 that may be used with the calculator. Without these ROM modules the definable keys 91 serve no function and accidently depressing them, or encountering them in the execution of a stored program, will result in a completely nondestructive no-operation.

The plug-in ROM modules 92 include the alpha ROM module mentioned above, a definable functions ROM module, a mathematics ROM module, a statistics ROM module, and a typewriter ROM module. Both the alpha ROM module and the typewriter ROM module redefine nearly all of the keys of the keyboard as well as defining the definable keys 91 themselves. The definable functions ROM module, the mathematics ROM module, and the statistics ROM module each uniquely define the definable keys alone and may each be used at the same time as the alpha ROM module or the typewriter ROM module.

A different overlay 192 is associated with each of the definable functions, mathematics, and statistics ROM modules and is employed with the definable keys 91 to identify the functions performed thereby when its associated ROM module is plugged into the calculator. Each of these overlays 192 comprises a thin metal template that fits over the definable keys 91 and latches into a recess around them. The graphics on these templates visually complete the key shapes and indicate the key function. A small tab positioned just above the nameplate releases each template, which then pops up enough to grasp. Three holes 196 near the top edge of each template allow direct viewing of three light-emitting diode indicator lights used to indicate various operating conditions associated with the routines implemented by the ROM module. When the overlay and its associated ROM module are not in use they may be secured together by a pair of tabs 198 provided on the ROM module.

A description of the additional key operations that may be provided by the plug-in ROM modules will now be given.

Alpha ROM Module

The Alpha ROM module redefines the keyboard input unit as indicated by the letters printed on the tops of the definable keys 91 and the letters and symbols printed on the front sides of most of the other keys to provide an "alpha keyboard" (see FIG. 8) containing 54 character-entry keys, 5 operational keys, and 16 "non-essential" keys (these non-essential keys are either inoperative or duplicate other keys during the alpha mode). During the alpha mode, the key-log feature is deactivated (thus, any keys pressed are not logged).

The 54 character-entry keys include all of the English alphabetic characters A-Z, all of the decimal numbers 0-9, and all of the following symbols $\sqrt{}$ (printed by the ÷ key, $\times$, $-$, $+$, $\pi$, $\rightarrow$, „ ., =, $, ?, (, ), %, ", and . Depressing any of these keys during the alpha mode, will cause the alphameric character or symbol indicated thereby to be printed out in line-printer fashion. The output printer unit operates as a line printer in that each character is not immediately printed out, but rather an entire line (16 characters) is first stored and then printed out. The print-out occurs as the 16th character is entered.

The 5 operational keys include the FMT key, the STOP key, a SPACE key (normally the CONTINUE key), a RETURN/CLEAR key (normally the CLEAR key), and a PAPER key.

During the alpha mode, the following operational keys are depressed to perform various printing operations. Depressing the FMT key twice redefines the keyboard to the alpha mode, after which character keys may be depressed. After the last character is entered, depressing the FMT key causes a line print, a line feed, and returns the keyboard to normal operation. (The output display is blanked during the alpha mode, although the contents of the x-, y-, and z-registers remain unchanged.) For example, the alphabet may be printed by sequentially depressing the RUN, STOP, FMT, FMT, A through Z, and FMT keys.

Depressing the SPACE key inserts a blank space in the printed line (similar in operation to the space bar on the typewriter).

Depressing the RETURN/CLEAR key causes a line print and advances the printer to the next line (i.e. like a typewriter carriage-return and line feed operation). The alpha mode remains set after this instruction. Successive CLEAR instructions will cause the printer to advance, without printing, one line for each instruction.

Depressing the STOP key terminates the alpha mode without a line print of line feed. Any characters entered but not printed will be erased when STOP is pressed. This instruction is not programmable and should be used while programming alpha messages.

The PAPER key is a manual paper advance control. This operation is not programmable.

The 16 "non-essential" keys include the $\Theta$, x y, $\uparrow$, SPACE/PRINT, RETURN/SUB, END, STEP/BACK, PRGM/STEP, FLOAT FIX (), RUN, PRGM, KEY LOG, LIST, LOAD, and RECORD keys. These keys are not essential for alpha printing operations. The non-essential keys which are programmable duplicate the SPACE key, while most of the non-programmable keys are "locked-out" (i.e. not operational) during alpha printing operations. Pressing BACK STEP or STEP PRGM will cause 1 or 0, respectively, to be printed.

Definable Functions ROM Module

Figures 9, 10, 11:
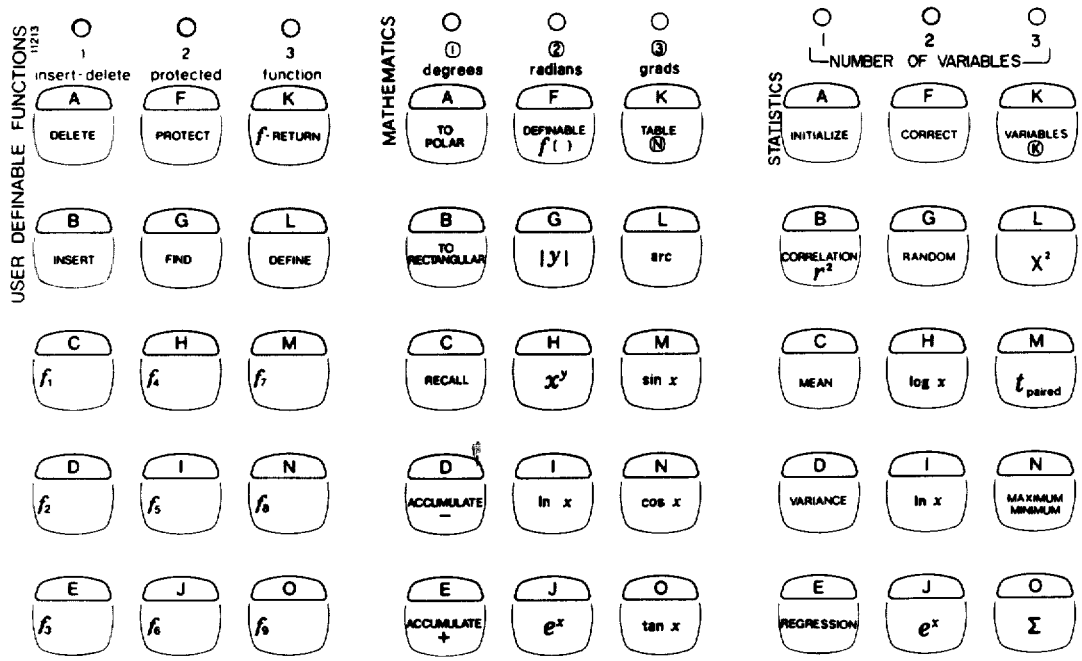
FIG. 9 is a plan view of the definable keys of the keyboard input unit employed in the adaptable programmable calculator of FIGS. 1 and 3A-B and the overlay associated with a definable functions plug-in read-only memory module that may be employed in the adaptable programmable calculator.
FIG. 10 is a plan view of the definable keys of the keyboard input unit employed in the adaptable programmable calculator of FIGS. 1 and 3A-B and the overlay associated with a mathematics plug-in read-only memory module that may be employed in the adaptable programmable calculator.
FIG. 11 is a plan view of the definable keys of the keyboard input unit employed in the adaptable programmable calculator of FIGS. 1 and 3A-B and the overlay associated with a statistics plug-in read-only memory module that may be employed in the adaptable programmable calculator.

When the definable functions ROM module is plugged into the calculator, the user may employ the definable keys 91 to perform the redefined functions identified by the associated overlay shown in FIG. 9. These functions include:

a. Defining special subroutines that can be called by a single key;

Protecting such subroutines against accidental erasure;

c. Deleting one, or more, of such subroutines when desired; and d. Deleting, inserting, or searching for keycodes in any stored program.

a. Defining a Function

A user definable function can be any sequence of program steps, beginning with the keys DEFINE F (i), where F(i) represents one of the keys F1 thru F9. The execution of such sequence of program steps must be terminated with the F-RET key in the same manner as the SUB/RET key in the case of subroutines.

EXAMPLE

The following is a function which puts $\pi$ in x, y, and z.

| Program Step | Key |
|---|---|
| 0000 | DEFINE |
| 0001 | F1 |
| 0002 | $\pi$ |
| 0003 | $\uparrow$ |
| 0004 | $\uparrow$ |
| 0005 | F-RET |

The above function is identified by the key F1. To execute this function simply press the F1 key in RUN mode or insert F1 in a program at the plate you want it executed.

EXAMPLE

The following is a call on F1 from another program (the program here happens to be another function F2).

| Program Step | Key |
|---|---|
| 0000 | DEFINE |
| 0001 | F2 |
| 0002 | CLR |
| 0003 | F1 |
| 0004 | F-RET |

Notice that we have assigned the same program step numbers to both the functions F1 and F2. Every function definition is assumed to start at program step 0000. All GO TO commands when present in a function are coded accordingly. This allows the user to define functions and delete them in a way independent of where they actually reside in the calculator memory. The key DEFINE in both of the above functions serves to mark the start of the definition of a function in the calculator memory. This key is treated as an error if it is pressed during RUN mode. The key DEFINE is also treated as an error if the user attempts to execute it in a program.

EXAMPLE

| Program Step | Key |
|---|---|
| 0000 | DEFINE |
| 0001 | F3 |
| 0002 | CLR |
| 0003 | DEFINE ← |
| 0004 | F2 |

The DEFINE at program step 0003 will be treated as an error when encountered during the execution of F3. The user here forgot to terminate the execution of F3 with F-RET. This error will cause the calculator to stop execution and turn on the STATUS light.

b. Protecting User Defined Functions

The protection feature allows the user to designate areas of memory to be a part of the calculator's executive system.

i. Protecting A Single Function Assume that you have just entered the definition of the function F1 in memory (the same F1 discussed earlier). After entering the last keystroke in the definition, namely F-RET, the program counter (y display) will point to program step 0006. Location 0005 which contains R-RET will be displayed in the z-register. Switch to the RUN mode. Press PROTECT. The light on the top of the PROTECT key (option 2 light) . . . . will come on. The definition of F1 is now protected up to and including the F-RET key. If you switch back to PROGRAM mode, whatever was in program step 0006 before will appear not to be at program step 0000. All the program steps used in defining F1 became "invisible". For all purposes these program steps are now a part of the calculator system. You can still execute F1 by pressing the corresponding key in RUN mode, or by calling on it from another stored program or function.

ii. Protecting Several User Defined Functions Assume now that both the functions F1 and F2, described earlier, are to be protected. After protecting F1 switch to the PROGRAM mode and enter the definition of F2, namely:

| Program Step | Key |
|---|---|
| 0000 | DEFINE |
| 0001 | F2 |
| 0002 | CLR |
| 0003 | F1 |
| 0004 | F-RET |

After entering the definition of F2 switch to the RUN mode. Press DELETE PROTECT. The protect light indicator (option 2) will go off. Press PROTECT. Both the definitions of F1 and F2 are protected. iii. Effect of Protection on User Memory When protecting a certain number of keystrokes the calculator subtracts that number from the total number of program steps available in user memory. The user can compute the number of program steps available at any time as follows. In RUN mode, press END, DELETE, PROTECT, switch to the PROGRAM mode and read the program step number in the y display, assume this number is p. The number of program steps available to the user are given by the simple formula:

Available Program Steps = $n - p$ The variable $n$ in the above formula is 500, 1012 or 2036 according to the amount of user memory purchased. After finding the value of p, as illustrated above, you can switch back to the RUN mode and press PROTECT again to re-establish the protection.

c. Deleting User Defined Functions

To delete a given function simply press the DELETE key followed by the name of the function to be deleted. The DELETE key only applies to the unprotected area of user memory. This prevents accidental erasure of protected functions. Pressing the DELETE key causes the Insert/Delete light to come on (option 1) indicating that a memory modification operation is to be performed. If after pressing the DELETE key you find that you did not want to delete after all, you can press the CLEAR key to abort the delete option. Pressing the CLEAR key at this time will cause the Insert/Delete light to go off. If the function to be deleted does not exist the error light will come on and the delete operation will be aborted. The DELETE key must be pressed while the calculator is in RUN mode. The DELETE key may be followed by a function name (F1 thru F9), CLEAR, or a digit. Other keys following the DELETE key will turn on the error light and abort the delete operation. If encountered during the execution of a stored program the DELETE key will cause the calculator to stop execution and turn on the error indicator.

DELETING THE LAST FUNCTION IN MEMORY

The delete operation is designed to delete a portion of user memory which starts with the DEFINE of the function to be deleted and ending with keystroke prior to the DEFINE of the next function in memory, of END. To illustrate, consider the following memory map.

| Program Step | Key |
|---|---|
| 0000 | DEFINE ← |
| 0001 | F1 |
| 0002 | CLR |
| 0003 | F-RET ← |
| 0004 | DEFINE |

| Program Step | Key |
|---|---|
| 0005 | F2 |
| 0006 | EEX |
| 0007 | 1 |
| 0008 | — |
| 0009 | IF X=Y |
| 0010 | F-RET |
| 0011 | CONT |
| 0012 | CONT |
| 0013 | CONT |
| 0014 | GO TO |
| 0015 | 4 |
| 0016 | END |
| 0017 | ... |

When pressing DELETE F1 the calculator will delete the memory portion delimited by the two arrows in the memory map. After deletion the DEFINE at program step 0004 will move to program step 0000. The following keystrokes will move accordingly. Since the last function in a user memory is not likely to be followed by another DEFINE it is advisable to terminate that function with the keystroke END as shown in the memory map (program step 0016). If the last function in memory is not terminated with END then by deleting that function the user will also delete that portion of memory which follows that function and terminates with an END. When deleting the last function in memory, the delete operation does not delete the END key. Thus deleting F2 from the memory map shown earlier will result in the following memory map.

| Program Step | Key |
|---|---|
| 0000 | DEFINE |
| 0001 | F1 |
| 0002 | CLR |
| 0003 | F-RET |
| 0004 | END |

The keystroke END becomes now the terminator to the definition of F1.

d. General Editing Capabilities

In addition to deleting functions the user of the definable function block is offered the capability of deleting, inserting, and searching for individual keystrokes in memory. This feature is discussed next.

i. Deleting Individual Keystrokes If the DELETE key is followed by a 4 digit address* the calculator will delete the keystroke contained in that address and move all the following keystrokes accordingly.

EXAMPLE:

Consider the memory map:

| Program Step | Key |
|---|---|
| 0000 | CLR |
| 0001 | GO TO |
| 0002 | 0 ← |
| 0003 | 5 |
| 0004 | END |
| 0005 | 1 |
| 0006 | ... |

To delete the keystroke at program step 0002 press the DELETE key in RUN mode, (Insert/Delete light will come on), followed by the keys 0 0 0 2. The resulting memory map will be:

| Program Step | Key |
|---|---|
| 0000 | CLR |
| 0001 | GO TO |
| 0002 | 5 |
| 0003 | END |
| 0004 | 1 |
| 0005 | ... |
| 0006 | ... |

Notice that the keystroke previously at 0003 is now at program step 0002. All the keystrokes following the deleted key up to the last keystroke in memory have been moved accordingly.

AUTOMATIC ADDRESS TERMINATION AND ABORTING A DELETE:

In the above example we used a 4 digit address to specify the keystroke to be deleted. The user can use a 3, 2, or one digit address if such an address is terminated by a non-numeric key other than CLEAR. The following delete commands are equivalent to that given in the last example:

| DELETE | 2 | STOP |
| DELETE | 02 | STOP |
| DELETE | 002 | STOP |

To abort a delete command before it is executed press the CLEAR key. The Insert/Delete light (option 1) will go off and the delete command will be cancelled. The CLEAR key can be pressed immediately after the DELETE key or during the entry of the address digits. Notice that the 4th digit in an address terminates that address. This digit signals to the calculator that the delete operation is to be performed. A CLEAR key following the 4th digit of an address will have no effect on a delete operation. After performing a delete operation the calculator switches off the Insert/Delete light. If the delete address is bigger than 2035 the status light will come on and the delete operation will be aborted. This number represents the maximum available program steps in the calculator.

ii. Inserting Individual Keystrokes

The definable function block also offers the user the capability of inserting key codes at any arbitrary program step. Example: Consider the following memory map:

| Program Step | Key |
|---|---|
| 0000 | CLR |
| 0001 | GO TO |
| 0002 | 9 ← |
| 0003 | END |
| 0004 | ... |

To insert a keystroke before the key at program step 0002, press INSERT in RUN MODE, (the Insert/Delete light will come on), followed by 0 0 0 2. Switch to PROGRAM mode. The y display will point to program step 0002. At this location you will find that a CONTINUE (Code 47) has been inserted. The keystroke originally at 0002 has now been moved to step 0003. All the keystrokes which follow this keystroke have been moved accordingly. To put a new keystroke at 0002, simply press the new key while you are still in PROGRAM mode. The key pressed will replace the CONTINUE inserted earlier by the calculator. Without replacing the CONTINUE at step 0002 the new memory map is as shown below:

| Program Step | Key |
|---|---|
| 0000 | CLR |
| 0001 | GO TO |
| 0002 | CONT |
| 0003 | 9 |
| 0004 | END |
| 0005 | ... |

The address in an INSERT command may ... be automatically terminated in the same manner described earlier in connection with DELETE. The insert operation can also be aborted in the same fashion. Notice that the insert operation effects the content of all the program steps following the one designated in that operation.

iii. Searching for a Given Keystroke in Memory:

The ability to search for a given keystroke in memory is provided by the FIND key. By pressing the FIND key, in RUN mode, followed by any other key on the keyboard the user commands the calculator to search for that key in memory starting at the current program counter value. If the key asked for is not found, the status light will come on. However if the key is found: the calculator will automatically switch to PROGRAM mode, and the Z register will contain the program step at which the key was found.

EXAMPLE:

Consider protecting a function definition area in memory. This area is terminated with the key END. Reset the program counter to 0000 by pressing GO TO 0 or END, in RUN mode. Now press FIND END, the z-register will now contain the terminating END in the function area. Press RUN PROTECT. The function area is now protected up to and including that terminating END.

PROGRAMMING HINTS:

The definable functions can be nested 5 levels deep, irrespective of regular subroutine nesting. A higher nesting value will cause the calculator to stop execution and turn on the status light.

The light on top of the F-RET key (option 3) when lit indicates that the user is executing a sequence of keystrokes in a function definition. If you press STOP while this light is on you may stop the calculator in the middle of a function. To reinitialize program execution press DELETE, F-RET in RUN mode, the F-RET light will go off and the program counter adjusted to the value it had when the function area of memory was called.

Calling on a non-existant function from a stored program will cause the calculator to stop execution and turn on the status light. The program counter at this time will point to the program step which contains the name of the function called.

MATHEMATICS ROM Module

When the mathematics ROM module is plugged into the calculator at the left-hand receptacle 94, the user may employ the definable keys 91 to perform the additional functions indicated by the mathematics overlay shown in FIG. 10. All of these additional functions are programmable. Any mathematically illegal functions performed either from the keyboard input unit or a stored program will turn on the STATUS light.

The units to be used in problems involving trigonometric functions or vector arithmetic are selected according to the procedure listed in Table A. The units specified by the appropriate indicator light above the definable key block.

Table A. Specifying Units

| To Specify: | Specifying Units Press: | | Indication: | | |
|---|---|---|---|---|---|
| DEGREES | TABLE N | 1 | Dėg | Rȧd | Gṙad |
| RADIANS | TABLE N | 2 | Dėg | Rȧd | Gṙad |
| GRADS | TABLE N | 3 | Dėg | Rȧd | Gṙad |

It should be noted that the setting of degrees, radians, and grads (360°=400 grads) is programmable.

Trigonometric functions of angles from 0° up to 5760° can be calculated at full accuracy; however, inverse trigonometric functions are calculated only for the principal values of the functions:

$$\iota = \sin^{-1} x; -90° \leq \iota \leq +90°$$

$$\iota = \cos^{-1} x; 0° \leq \iota \leq +180°$$

$$\iota = \tan^{-1} x; 90° \leq \iota \leq +90°$$

For instance: cos 150°=cos 210°=cos 510°=(etc.)=−.866 But: $\cos^{-1} 0.866 = 150°$ The sin x key is depressed to calculate the Sine of the contents of the x-register and insert the result in the x-register.

The cos x key is depressed to calculate the Cosine of the contents of the x-register and insert the result in the x-register.

The tan x key is depressed to calculate the Tangent of the contents of the x-register and insert the result in the x-register.

The arc key is depressed followed by a trigonometric key to calculate the inverse trigonometric function of the contents of the x-register and insert the result in the x-register.

For example, the $\sin^{-1} 0.5$ may be calculated by sequentially depressing the TABLE N, 1, ., 5, arc, and sin x keys. Depression of the TABLE N and 1 keys selected the units (degrees) per Table A above.

The following logarithmic and exponential functions may all be performed by employing one or two keystroke operations.

The TABLE N and 4 keys are sequentially depressed in the order named to calculate the logarithm (to base 10) of the contents of the x-register and display the result in the x-register.

The TABLE N and 5 keys are sequentially depressed in the order named to raise 10 to the power indicated by the contents of the x-register and display the result in the x -register (i.e. $10^x$). For example, the number 0.69897 may be raised to the power indicated by the contents of the x-register by seqentially depressing the ., 6, 9, 8, 9, 7, TABLE N, and 5 keys.

The ln x key is depressed to calculate the logarithm (to base e, i.e. natural logarithm) of the contents of the x-register and display the result in the x-register (i.e. ln x). For example, the $\sqrt[5]{23}$ may be calculated by sequentially depressing the 2, 3, ln x, , 5, ÷, ↓, and $e^x$ keys.

The $e^x$ key is depressed to raise e (i.e. 2.718 ....) to the power indicated by the contents of the x-register and display the result in the x-register (i.e. $e^x$).

The $x^y$ key is depressed to raise the contents of the x-register to the power indicated by the contents of the y-register. The result is displayed in the x-register, and the contents of the y-register remain unchanged.

The following keys provide capability for performing complex and vector arithmetic with a single keystroke operation.

The TO POLAR key is depressed to convert rectangular coordinates (consisting of $x$ and $y$ components in the x-and y-registers, respectively) to polar coordinates ($\iota = \tan^{-1} y/x$, $R = \pm\sqrt{x^2+y^2}$). When converting from rectangular (cartesian) to polar coordinates, the calculated angle $\iota$ will be within the range of $-180° \leq \iota \leq 180°$. The final display is:

| | |
|---|---|
| temporary z | — |
| accumulator y | (Angle $\theta$) |
| keyboard x | (Radius R) |

For example, the coordinates 4, 3 (x, y) may be converted to polar form by sequentially depressing the TABLE N, 1 (these keys select the units, i.e., degrees), 3, , 4, and TO POLAR keys.

The TO RECTANGULAR key is depressed to convert polar coordinates, when the radius (R) and the angle ($\iota$)are in the x- and y-registers, respectively, to rectangular coordinates ($y = R \sin \iota$, $x = R \cos \iota$). The final display is:

| | |
|---|---|
| temporary z | — |
| accumulator y | (y component) |
| keyboard x | (x component) |

For example, the polar coordinates R = 8, $\iota$ = 120° (or -240°) may be converted to rectangular form by sequentially depressing the TABLE N, 1, 1, 2, 0, , 8, and TO RECTANGULAR keys. The final display is:

| | |
|---|---|
| temporary z | |
| accumulator y | 6.928 |
| keyboard x | −4.000 |

The ACCUMULATE +, ACCUMULATE −, and RECALL keys are storage and recall keys associated with the a - and b-data storage registers. These keys provide complete capabilities for vector addition and subtraction. The ACCUMULATE + key is depressed to simultaneously add the contents of the x- and a-registers together and the contents of the y- and b-registers together. The sums are entered in the a- and b-registers, respectively, while the x- and y-registers remain unchanged.

The ACCUMULATE - key is depressed to simultaneously subtract the contents of the x-register from the contents of the a-register and the contents of the y-register from the contents of the b-register. The remainders are entered into the a- and b-registers, respectively, while the contents of the x- and y-registers remain unchanged.

The TABLE N key permits access to 10 more ROM functions than there are definable keys. A list of these functions is given in TABLE B below. The TABLE N key may be followed by any key. If this key is different from a numeric or FMT, no operation is performed.

Table B

| TABLE N | FUNCTION |
|---|---|
| 1 | SET DEGREES ⎫ |
| 2 | SET RADIANS ⎬ SETS ARGUMENT UNITS FOR TRIGONOMETRIC FUNCTIONS |
| 3 | SET GRADS ⎭ |
| 4 | Log$_{10}$x |
| 5 | 10$^x$ |
| 6 | DEGR, MIN, SEC → DECIMAL DEGREES |
| 7 | DECIMAL DEGREES → DEGR, MIN, SEC |
| 8 | X! |
| 9 | ROUND |
| FMT | AUTOMATIC PLOTTER SCALING |

The first five functions of the TABLE N key have already been explained above. However, this key may also be used to perform any of the next five functions (namely, angle conversion, calculation X!, rounding a number to a specified power of ten, and plotter scaling) not previously described above.

The TABLE N and 6 keys are sequentially depressed in the order named to convert an angle expressed in degrees, minutes and seconds to decimal degrees. The angle must be entered into the calculator as follows:

| DISPLAY | |
|---|---|
| temporary z ← | (Degrees) |
| accumulator y ← | (Minutes) |
| keyboard x ← | (Seconds) |

The results in decimal degrees, appears in the x-register, while the y- and z-registers are cleared. This is illustrated as follows:

| | |
|---|---|
| temporary z | 0 |
| accumulator y | 0 |
| keyboard x | DECIMAL DEGREES |

The TABLE N and 7 keys are sequentially depressed in the order named to convert an angle expressed in decimal degrees to degrees, minutes and seconds. The angle to be converted must be entered into the x-register, and the resultant angle appears as in the previous display. However, the contents of the y- and z-registers need not be zero for the instruction TABLE N, 7.

The TABLE N and 8 keys are sequentially depressed in the order named to replace the contents of the x-register with X! (where x 0 ≤ + ≤ 69).

The TABLE N and 9 keys are sequentially depressed in the order named to round the contents of the y-register to the power of ten indicated by the integer value of the contents of the x-register. The rounded number appears in the x-register, while the y-register remains unchanged. For example, the number 5610.0 may be rounded to 10$^2$ (or nearest 100), by sequentially depressing the 5, 6, 1, 0, and ↑ followed by the 2, TABLE N, and 9 keys.

| DISPLAY | |
|---|---|
| accumulator y | 5610.000 |
| keyboard x | 5600.000 (y rounded) |

Similarly, the contents of the y-register may be rounded to another power (10$^4$) by sequentially depressing the 4, TABLE N, and 9 keys.

| DISPLAY | |
|---|---|
| accumulator y | 5610.000 |
| keyboard x | 10000.000 (y rounded) |

A fractional number may be rounded by inserting a negative number into the x-register. For example, the number 0.005 may be rounded to the $10^{-2}$ or nearest 1/100 by sequentially depressing the ., 0, 0, 5, ↑, CHG SIGN, 2, TABLE N, and 9 keys.

| DISPLAY | |
|---|---|
| accumulator y | 0.005 |
| keyboard x | 0.010 (y rounded) |

A problem usually encountered when writing a calculator/plotter program is that of scaling the available problem variables to coordinates which the plotter can use. The plotter scaling feature to be described, simplifies this typical plotting problem. The TABLE N, FMT, and ↑ or ↓ keys are sequentially depressed in the order named to replace the plotter problem variables, which are entered in corresponding x- and y-registers. with scaled coordinates. The user variable maxima and minima for this scaling operation are stored in user data storage registers 001–004. The foregoing sequence of keys controls the plotter (using the scaled variables) in the same manner as FMT, ↑, or ↓ described above.

The DEFINABLE ƒ() key is used to label and "call" an often used (or favorite) function which is programmed as a subroutine in the calculator. The definable function may be executed at any time from the keyboard by depressing the DEFINABLE key, or it may be "called" in a program by inserting the DEFINABLE (key) instruction. The definable function is programmed similar to a "LABEL" subroutine, while the function is executed as a normal subroutine; except it may be "called" with only one keystroke or program step.

When the DEFINABLE ƒ (), key is depressed the program counter searches for a subroutine labeled DEFINE ƒ (), executes, and returns. This key can be used both in keyboard and program control. A user written subroutine to be called by the DEFINABLE ƒ () key can be stored anywhere in the program memory, its first program steps must be LABEL, DEFINABLE ƒ (); its last step must be SUB/RETURN. There are no restrictions on the operations this subroutine may perform. It is illustrated by the following example:

```
            LABEL
         DEFINABLE f ( )
              ↑
              e^x
             x ⇄ y
           CHG SIGN
              e^x
              +
              2
              ÷
             SUB
            RETURN
```

Whenever the key DEFINABLE ƒ () is called either in RUN or PROGRAM mode, the hyperbolic cosine of the number in the x-register is computed and placed in the y-register by this subroutine.

The TABLE N and CLEAR x keys are depressed to clear all numerical storage registers without affecting the a- and b-registers or the x-, y- and z-registers.

A programmed subroutine may be repeated m number of times by inserting the following keys at the end of the subroutine: TABLE N, SUB RETURN, and n, where n may be any key form 0 to 9 indicating a data storage register that contains m, and m is equal to the absolute integer value of the contents of the n-register. After the subroutine has been repeated n times, the program exits the subroutine and resumes normal program operation at the program step following the subroutine "calling instructions". The iterative subroutine feature may be added to a "LABEL" subroutine, but when the LABEL subroutine is "called" (during a program) the call instructions must contain 6 program steps. The following partial program shows how to call the LABEL π iterative subroutine.

| | Iterative "LABEL" Subroutine | | |
|---|---|---|---|
| STEP | KEY | KEY CODE | COMMENT |
| 0400 | — | — | |
| 0401 | CONTINUE | 47 | Subroutine |
| 0402 | CONTINUE | 47 | CALLS |
| 0403 | GO TO | 44 | Instructions |
| 0404 | SUB RETURN | 77 | |
| 0405 | LABEL | 31 | (6 keys) |
| 0406 | π | 56 | |
| 0407 | + | 35 | Return from Subroutine |

Stastistics ROM Module

The primary function of the statistics ROM module is to carry out the summations of variables, cross-products, and squares needed as fundamental quantities in a variety of statistical analyses. These summations are generated in the general data storage user registers, and the user must be careful to avoid any operations which might destroy or alter the contents of these registers. The number of registers used is dependent on the number of variables treated - as defined by the user. The registers used are:

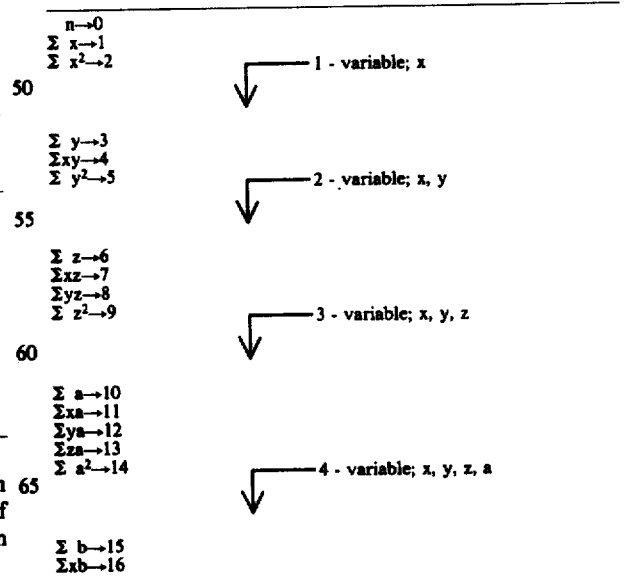

-continued

Σyb→17
Σzb→18
Σab→19
Σb²→20

┌──── 5 - variables; x, y, z, a, b
▼

These are graphically summarized in an easy-to-recall form in this table*

|   | 1 | x | y | z | a | b |
|---|---|---|---|---|---|---|
| 1 | 0 | 1 | 3 | 6 | 10 | 15 |
| x |   | ①² | 4 | 7 | 11 | 16 |
| y |   |   | ②⁵ | 8 | 12 | 17 |
| z |   |   |   | ③⁹ | 13 | 18 |
| a |   |   |   |   | ④¹⁴ | 19 |
| b |   |   |   |   |   | ⑤²⁰ |

In addition to the user-registers 0→20 utilized as shown above, registers 21→27 are used for collection of maximum/minimum values, for the "seed" of the pseudo-random number generator. This is shown below:

$x_{min}$→21
$x_{max}$→22
$y_{min}$→23
$y_{max}$→24
$z_{min}$→25
$z_{max}$→26
RN→27

Any registers not used in a specific sequence are available. For example, if 2 - variable operations are set up, only registers 0→5 are in use, and 6→20 are free for other purposes.

When the statistics ROM module is plugged into the calculator, the user may employ the definable keys 91 to perform the additional functions indicated by the statistics overlay shown in FIG. 11. All of these additional functions are programmable and will hereinafter be described key-by-key.

The VARIABLES K key used to define the number of variables to be treated, 1 to 5. It must be followed immediately by a digit key, 1 to 5. If any other key is depressed after this key, the STATUS light will be turned on, and the calculator will halt in the display mode. The VARIABLE key and the erroneous key following it are ignored - there is no other action.

If a correct digit key follows, one or more of the indicator lights will come on, to signal the number of variables selected. The pattern is:

| 1 - variable | 1 - light |
| 2 - variable | 2 - light |
| 3 - variable | 3 - light |
| 4 - variable | 1 and 3 - lights |
| 5 - variable | 2 and 3 - lights |

The definition of the number of variables affects subsequent use of the Σ key, MAX/MIN key, and the INITIALIZE and CORRECT keys used in conjunction with it. The number of variables remains unchanged until the VARIABLES key is used to change it, which may be done at any time.

Σ

This key is used to accumulate the data summations of variables, cross-products, and squares as outlined previously. The number of summations is determined by the VARIABLES key described above. That is, the contents of the registers utilized are:

| 1 - variable | x |
| 2 - variable | x, y |
| 3 - variable | x, y, z |
| 4 - variable | x, y, z, a |

-continued

| 5 - variable | x, y, z, a, b |

If the summation key (Σ) is depressed without a previous definition of the number of variables (VARIABLES key followed by digit 1→5), the number of variables is set at 3. It will remain at this setting unless changed by use of VARIABLES The Σ key generates the summations, and leaves the contents of x, y, z, a, and b unchanged.

The INITIALIZE and CORRECT keys work in conjunction with the summation key. They must precede the Σ key.

When the sequence INITIALIZE - Σ is used, all registers (defined by the number of variables set) involved in the summations are cleared to zero. This sequence should always be used before the start of a series of summations on a set of data - otherwise any previous contents of the registers are included in the summations.

If, after depressing the Σ key, it is discovered that the contents of x, y, z, a, or b were erroneous, the user may remove the erroneous data from the summation by depressing CORRECT - Σ keys in that sequence. This will remove all variables, cross-products, and squares of that data from the summation. The user may then correct the data and reenter it by depressing the Σ key. Since x, y, z, a, and b are unchanged by the use of Σ (or CORRECT - Σ) this is most conveniently done when the erroneous data is still intact - i.e., immediately after Σ. However, if the erroneous data is not discovered until later, the user must reenter the erroneous data in x through b (only x and y if 2 - variable, etc.), use CORRECT - Σ, and then correct the erroneous data and enter it with the Σ key.

The user must be careful not to do any operations during a summation-sequence on data which will alter the contents of any user-registers involved in the summation.

However, the contents of any of the summation-registers may be recalled and used at any time, so long as they are not altered.

Once a data-sequence has been entered by use of the Σ key, the summations are available for any desired statistical analysis. For user convenience, four commonly used statistical processes are implemented, to be performed by a single keystroke. The function of these four keys will follow.

The MEAN key computes (from the collected summations) the arithmetic mean of up to three variables; x, y, and z. If 4 or 5 variables are set, the MEAM key operates on only 3, and does not form the other two means (on a and b).

For various variable settings, the following computations are made, and appear in the x, y, z, registers:

1 - variable    $z$   $\phi \cdot \phi$
                $y$   $\phi \cdot \phi$
                $x$   $\bar{x} = \dfrac{\Sigma}{n} = \dfrac{(1)}{(0)}$ where (1) means "contents of register - 1".

2 - variable    $z$   $\phi \cdot \phi$
                $y$   $\bar{y} = \dfrac{\Sigma y}{n} = \dfrac{(3)}{(0)}$
                $x$   $\bar{x}$ -continued 3 - variable
$$z\bar{z} = \frac{\Sigma z}{n} = \frac{(6)}{(0)}$$
$$y\bar{y}$$
$$x\bar{x}$$

These computations are carried out and the results appear in $x$, $y$, $z$ as shown, without changning the contents of any of the summation registers.

The VARIANCE key computes (from the collected summations) the variance of up to three variables, $x$, $y$, and $z$. If 4 or 5 variables are set, the VARIANCE key operates on only 3, and does not form the variance of $a$ or $b$.

The following computations are performed:

$$x = \frac{\Sigma x^2 - \frac{(\Sigma x)^2}{n}}{n-1} = \frac{(2) - \frac{(1)^2}{(0)}}{(0) - 1}$$

$$y = \frac{\Sigma y^2 - \frac{(\Sigma y)^2}{n}}{n-1} = \frac{(5) - \frac{(3)^2}{(0)}}{(0) - 1}$$

$$z = \frac{\Sigma z^2 - \frac{(\Sigma z)^2}{n}}{n-1} = \frac{(9) - \frac{(6)^2}{(0)}}{(0) - 1}$$

The results appear in the $x$, $y$, $z$ registers in the pattern.

|   | 1 - variable | 2 - variable | 3 - variable |
|---|---|---|---|
| z - | $\phi.\phi$ | $\phi.\phi$ | $s_z^2$ |
| y - | $\phi.\phi$ | $s_y^2$ | $s_y^2$ |
| x - | $s_x^2$ | $s_x^2$ | $s_x^2$ |

The contents of all summation-registers used in these computations remain unchanged.

The REGRESSION key performs linear regression (least-squares curve fitting) using the accumulated summations. The computations and results are controlled by the variable-setting, as outlined below:

Variable - 1: The regression of a single variable on itself is not performed. If REGRESSION is depressed with VARIABLES - 1 set, the STATUS light is turned on, and the calculator halts in the display mode. There will be no other action - the contents of $x$, $y$, $z$, and all summation-registers will be unchanged.

Variable - 2: The regression of the dependent variable on one independent variable is performed for the equation:

$$y = a_0 + a_1 x$$

The results are placed in $x$, $y$, $z$ in the pattern:
$z-\phi.\phi$
$y-a_0$
$x-a_1$ The contents of all summation-registers used in the computation remain unchanged.

Variable - 3: The regression of the dependent variable on two independent is performed for the equation:

$$z = a_0 + a_1 x + a_2 y$$

The results are placed in $x$, $y$, $z$ in the pattern:

$z-a_0$
$y-a_2$
$x-a_1$

The contents of all summation-registers used in the computation remain unchanged.

Variable 4 - and Variable - 5: This situation is treated as Variable - 3. Four - and 5 - variable regression may be performed by user-programming. All summations required are generated by the $\Sigma$ key when variables are set at 4 or 5.

$r^2$

The $r^2$ key generates the correlation coefficient (a measure of goodness-of-fit) for the linear regressions performed by the REGRESSION key. The computations performed are controlled by the variable setting.

Variable - 1: No computations are performed - the key is ignored.

- 2: The correlation coefficient of the linear regression for:

$$y = a_0 + a_1 x$$

is computed.

The computations performed are best described by introduction of a subsidiary quantity:

$$\mu x_i x_j = \Sigma x_i x_j - \frac{(\Sigma x_i)(\Sigma x_j)}{n}$$

The correlation-coefficient for variable - 2 is then defined to be:

$$r^2 = \frac{(\mu xy)^2}{\mu xx \mu yy}$$

This result is placed in register $x$, and $y$ and $z$ are cleared.

Variable - 3: The correlation-coefficient of the linear regression for:

$$z = a_0 + a_1 x + a_2 y$$

is computed. This is:

$$r^2 = \frac{a_1 \mu_{xx} + a_2 \mu_{yx}}{\mu_{zz}}$$

The result is placed in register $x$, and $y$ and $z$ are cleared.

The MAX/MIN key is used to collect the maximum and minimum values of the variables $x$, $y$, and $z$. Since these values are stored in registers 21 through 26, they do not affect the summation registers ($\Sigma$ key). Thus, MAX/MIN information may be collected on the same data on which summation information is being collected.

The MAX/MIN storage registers 21 through 26 are initialized by the key-sequence INITIALIZE - MAX/MIN. This results in loading the registers with:

| (21),(23),(25) | $(x,y,z)_{min} = 10^{99}$ |
| (22),(24),(26) | $(x,y,z)_{max} = -10^{99}$ |

All six registers are initialized without regard to the variable-number setting.

When MAX/MIN is depressed, the contents of $x$ (1-variable), $x$ and $y$ (2-variable) or $x$, $y$, and $z$ (3, 4, or 5-variable) are compared to the stored contents of the max/min registers. If the new value is less than the contents of the associated "min" register, the new value is substituted if not, the register is left unchanged. The maximums are handled correspondingly. Thus, at any time the max/min registers contain the max/min of the input data since the last initialization. This data is not displayed - the user must recall it, as needed, from the appropriate register.

The CORRECT key does not work in association with the MAX/MIN key, since any previous values changed are lost irretrievably by the MAX/MIN operation.

*t*

The *t* key collects summations necessary to compute a *t*-statisticon data in *x* and *y*, and computes and displays the statistic. The overall action is quite different from the Σ key, which collects summations only, and leaves the original data unchanged. In contrast, the *t* key collects needed summations, computes and presents the *t*-statistic, and destroys the data just entered.

Further, the *t*-summations are stored in registers 0, 1, and 2 which are the same registers used by the Σ key. Therefore, use of the Σ and *t* key cannot be intermixed.

The summation accumulated are:

$$n \longrightarrow 0$$
$$\Sigma(x - y)\ \Sigma D \longrightarrow 1$$
$$\Sigma(x - y)^2 = \Sigma D^2 \longrightarrow 2$$

These are accumulated with each depression of the *t* key. The three registers may be cleared for starting a new data-sequence by the key-sequence INITIALIZE-*t*.

If an error is made in data entry and the erroneous data is included in the summations by depression of the *t* key, it is convenient to have a means for removing the erroneous data. However, the data has been destroyed in order to present the *t*-statistic which is computed after each key depression. When the user discovers the data error, he may reenter the erroneous data in *x* and *y*. Then, depression of CORRECT - *t* ill remove the data from the summation. He may then reenter the correct data and include it by depressing the *t* key.

The computations performed from the summations are:

$$\overline{D} = \frac{\Sigma D}{n} = \frac{\Sigma(x - y)}{n}$$

$$\frac{\overline{D}}{s_{\overline{D}}} = \frac{\overline{D}}{\sqrt{\frac{\Sigma(x - y)^2 - \frac{(\Sigma(x - y))^2}{n}}{n(n - 1)}}}$$

$\overline{D}$ is placed in the *z*-register, *n* in *y*, and *t* in *x*.

$X^2$

The $X^2$ key accumulates the summations and then computes and presents the chi-squared statistic at each depression of the key. It's general operation is the same as the *t* key in that:

1. Summations are accumulated in 0 and 1 so that use of $X^2$ and Σ cannot be mixed.
2. The presentation of results after each key depression destroys the data entry in *x* and *y*. Correction for erroneous data can be accomplished by reentering the bad data and then depressing CORRECT - $X^2$.
3. The registers used (0 and 1) are cleared by depressing INITIALIZE -$X^2$.

The summations accumulated are:

$$n \longrightarrow 0$$
$$\Sigma \frac{(x - y)^2}{y} \longrightarrow 1$$

In the normal context for use of chi-square the "observed" value is in *x*, the "expected" value in *y*.

The RANDOM key causes the computation of a sequence of pseudo-random numbers, uniformly distributed in the interval $0 \geq RN \geq 1$. The method used is congruential products. It is necessary for the user to provide a "seed" for the sequence before using the RANDOM key. A given seed will produce the same sequence of pseudo-random numbers each time it is used.

The seed should be stored by the user into register 27. After each depression of RANDOM, the newly-generated pseudo-random will be stored in register 27 as a new seed, and the number will also be presented in the *x* - register. They *y* and *z* registers remain unchanged.

The initial seed provided by the user should be selected with certain rules in mind in order to obtain acceptable pseudo-random number properties. They are:

1. Enter a decimal fraction consisting of 12 digits (i.e., enter a complete number including guard-digits, even though they cannot be seen).
2. The number should be odd.
3. The number should not be evenly divisible by 5.

The $LOG_{10}x$, $LOG_e x$, and $e^x$ keys provide the specified mathematical function on the argument in *x*, and the result is left in the *x*-register. No other registers are changed.

We claim:

1. An electronic calculator comprising;
   a keyboard input unit for entering information into the calculator;
   a basic first memory unit into which information may be written and from which information may be read;
   a basic second memory unit for storing routines and/or subroutines to be executed by the calculator in performing selected functions;
   one or more additional memory units for storing routines and/or subroutines to be executed by the calculator in performing additional selected functions;
   plug-in adaptor means for enabling the user to removably plug at least one of said additional second memory units into the calculator to increase the number of functions that may be performed by the calculator;
   processing means responsive to information from the keyboard input unit or the basic first memory unit for selectively executing one or more of the routines and/or subroutines stored in the basic second memory unit or in any of the additional second memory units plugged into the calculator to perform one or more of the selected functions employing information from one or both of the keyboard input and basic first memory units; and an output unit for providing an output indication of the selected functions performed by the calculator;

said keyboard input unit including a first plurality of keys for enabling the user to manually initiate the basic functions that may be performed by the calculator without an additional second memory unit, and a second plurality of keys employed alone or with one or more of the first plurality of keys for enabling the user to manually initiate the added functions that may be performed by the calculator when each additional second memory unit is plugged into the calculator;

some of said second plurality of keys serving as control keys and others as definable keys when one of the additional second memory units is plugged into the calculator;

said one of the additional second memory units including logic responsive to user operation of said keyboard input unit means for enabling the control keys to be employed either alone or with one or more of the first plurality of keys for associating one or more programs then stored in the first memory unit with one or more of the definable keys or for defining one or more functions to be performed by the calculator, said logic means further including means for storing each defined function as a program in the basic first memory unit, and for associating each defined function with one of the definable keys whereby each program or defined function associated with one of the definable keys may be initiated by that definable key.

2. An electronic calculator as in claim 1 including a keyboard overlay for being positioned adjacent to the second plurality of keys to designate the added functions that may be initiated by the second plurality of keys when said one of the additional second memory units is plugged into the calculator.

3. An electronic calculator comprising:
a keyboard input unit for entering information into the calculator, said keyboard input unit including one or more definable keys, the functions of which may be defined by the user;
a basic first memory unit into which information may be written and from which information may be read;
a basic second memory unit for storing routines and/or subroutines to be executed by the calculator in performing selected functions;
one or more additional memory units for storing routines and/or subroutines to be executed by the calculator in performing additional selected functions;
plug-in adaptor means for enabling the user to removably plug at least one of said additional second memory units into the calculator to increase the number of functions that may be performed by the calculator, one of said additional second memory units including logic means responsive to user operation of said keyboard input unit for enabling the user to define one or more functions to be performed by the calculator and for associating each defined function with one of said definable keys of the keyboard input unit whereby each defined function may be initiated by the associated definable key;
processing means responsive to information from the keyboard input unit or the basic first memory unit for selectively executing one or more of the routines and/or subroutines stored in the basic second memory unit or in any of the additional second memory units plugged into the calculator to perform one or more of the selected functions employing information from one or both of the keyboard input and basic first memory units; and
an output unit for providing an output indication of the selected functions performed by the calculator.

4. An electronic calculator as in claim 3 wherein said one of the second memory units and said processing means include logic means for enabling each defined function to be stored as a program in the basic first memory unit.

5. An electronic calculator as in claim 4 wherein said one of the additional second memory units includes logic for enabling one or more control keys of the keyboard input unit to be employed for associating one or more programs then stored or being stored in the basic first memory unit with one or more definable keys.

6. An electronic calculator as in claim 5 wherein said keyboard input unit includes a protect key, and said one of the additional second memory units includes logic responsive to actuation of the protect key for protecting a defined function from being inadvertently altered or eraced.

7. An electronic calculator comprising:
a keyboard input unit for entering information into the calculator, said keyboard unit including one or more definable keys, the functions of which may be defined by the user;
a first memory unit into which information may be written and from which information may be read;
a second memory unit for storing routines and/or subroutines to be executed by the calculator in performing selected functions;
processing means responsive to information from the keyboard input unit or the first memory unit for selectively executing one or more of the routines and/or subroutines stored in the second memory unit to perform selected functions employing information from one or both of the keyboard input and first memory units;
means responsive to user operation of said keyboard input unit for enabling the user to define one or more functions to be performed by the calculator for associating each defined function wih a definable key of the keyboard input unit whereby each defined function may, said means for enabling further including means for storing said defined functions in said first memory unit;
means for enabling the user to protect each defined function by preventing it from being inadvertently altered or erased from said first memory unit; and
an output unit for providing an output indication of the functions performed.

* * * * *

UNITED STATES PATENT AND TRADEMARK OFFICE
CERTIFICATE OF CORRECTION

PATENT NO. : 4,063,221
DATED : December 13, 1977
INVENTOR(S) : Robert E. Watson; Jack M. Walden; Charles W. Near It is certified that error appears in the above-identified patent and that said Letters Patent are hereby corrected as shown below:

Column 7, line 49, "diagram" should read --diagrams--;

Column 8, line 45, "S-bus" should read --$\overline{S}$-bus--; "R-bus" should read --$\overline{R}$-bus--;

Column 8, line 51, "POP" should read --$\overline{POP}$--;

Column 10, line 8, "S-bus" should read --$\overline{S}$-bus--;

Column 11, line 45, "R-bus" should read --$\overline{R}$-bus--;

Column 13, line 49, "symbols ✓ (printed" should read --symbols @, √, / (printed--;

Column 13, line 50, after "key" insert -- ) --; after "and" insert --#--;

Column 13, line 61, "RETURN/CLEAR" should read --CLEAR/RETURN--;

Column 14, line 10, "RETURN/CLEAR" should read --CLEAR/RETURN--;

Column 14, line 19, "should be" should read --should not be--;

Column 14, line 23, "the θ, x y," should read --the ↓, x≠y,--;

Column 14, lines 24-25, "SPACE/PRINT, RETURN/SUB, END, STEP/BACK, PRGM/STEP" should read --PRINT/SPACE, SUB/RETURN, END, BACK/STEP, STEP/PRGM--;

Column 14, line 43, before "Protecting" insert --b.--;

UNITED STATES PATENT AND TRADEMARK OFFICE
CERTIFICATE OF CORRECTION

PATENT NO. : 4,063,221
DATED : December 13, 1977
INVENTOR(S) : Robert E. Watson; Jack Walden; Charles W. Near It is certified that error appears in the above-identified patent and that said Letters Patent are hereby corrected as shown below:

Column 15, line 3, "plate" should read --place--;

Column 15, line 47, make a new paragraph starting with the word "Assume";

Column 15, line 53, "R-RET" should read --F-RET--;

Column 15, line 60, "not" should read --now--;

Column 15, lines 67-68, make a new paragraph starting with the word "Assume";

Column 16, line 15, make a new paragraph starting with the words "iii. Effect";

Column 16, line 16, make a new paragraph starting with the word "When";

Column 16, line 58, after "with" insert --the--;

Column 16, line 59, "of" (second occurrence) should read --or--;

Column 17, line 48, make a new paragraph starting with the word "If";

Column 17, after the memory map table and before line 65, insert the following footnote: --*See next paragraph on Automatic Address Termination for further details on address length.--;

Column 19, line 14, make a new paragraph starting with the word "Notice";

UNITED STATES PATENT AND TRADEMARK OFFICE
CERTIFICATE OF CORRECTION

PATENT NO. : 4,063,221
DATED : December 13, 1977
INVENTOR(S) : Robert E. Watson; Jack Walden; Charles W. Near It is certified that error appears in the above-identified patent and that said Letters Patent are hereby corrected as shown below:

Column 20, line 26, the function "$\theta = \tan^{-1} x; 90° \leq \theta \leq + 90°$" should read --$\theta = \tan^{-1} x; -90° \leq \theta \leq + 90°$--;

Column 20, line 65, "x, , 5," should read --x, ↑, 5,--;

Column 21, line 11, "$(\theta = \tan^{31} ly/x, R = \pm x^2 + y^2)$" should read --$(\theta = \tan^{-1} y/x, R = \sqrt{x^2 + y^2})$--;

Column 21, line 25, "3, , 4," should read --3, ↑, 4,--;

Column 21, line 29, the function "(y = R SIN θx = R Cos θ)" should read --(y = R Sin θ, x = R Cos θ)--;

Column 21, line 38, "0, , 8," should read --0, ↑, 8,--;

Column 21, line 50, make a new paragraph starting with the words "The ACCUMULATE";

Column 22, line 50, the function "x 0 ≤ + ≤ 69" should read --x 0 ≤ |x| ≤ 69--;

Column 23, line 42, delete the comma;

Column 24, line 32, in the table under the KEY column, " + " should read -- ÷ --;

Column 25, line 36, after "key" insert --is--;

Column 26, line 62, the function "$_x \bar{x} = \frac{\Sigma}{n} = \frac{(1)}{(0)}$" should read --$x \quad \bar{x} = \frac{\Sigma x}{n} = \frac{(1)}{(0)}$--;

UNITED STATES PATENT AND TRADEMARK OFFICE
CERTIFICATE OF CORRECTION

PATENT NO. : 4,063,221

DATED : December 13, 1977

INVENTOR(S) : Robert E. Watson; Jack Walden; Charles W. Near

It is certified that error appears in the above-identified patent and that said Letters Patent are hereby corrected as shown below:

Column 26, line 67, the function "$_y \bar{Y} = \frac{\Sigma Y}{n} = \frac{(3)}{(0)}$" should read -- $Y \quad \bar{Y} = \frac{\Sigma Y}{n} = \frac{(3)}{(0)}$ --;

Column 27, line 11, "changning" should read --changing--;

Column 28, line 20, before "- 2" insert --Variable--;

Column 29, line 9, underscore "not";

Column 29, line 15, "statisticon" should read --statistic on--;

Column 29, line 23, underscore "cannot";

Column 29, line 44, "ill" should read --will--;

Column 29, line 55, the function "$\sqrt{\frac{\Sigma(x-y)^2 - \frac{(\Sigma(x-y))}{n}}{n(n-1)}}$" should read -- $\sqrt{\frac{\Sigma(x-y)^2 - \frac{(\Sigma(x-y))^2}{n}}{n(n-1)}}$ --;

Column 29, line 58, "D" should read --$\bar{D}$--;

Column 30, line 51, after "additional" insert --second--;

Column 31, line 18, after "logic" insert --means--;

Column 31, line 19, delete "means";

UNITED STATES PATENT AND TRADEMARK OFFICE
CERTIFICATE OF CORRECTION

PATENT NO. : 4,063,221

DATED : December 13, 1977

INVENTOR(S) : Robert E. Watson; Jack Walden; Charles W. Near

It is certified that error appears in the above–identified patent and that said Letters Patent are hereby corrected as shown below:

Column 31, line 49, after "additional" insert --second--; and

Column 32, line 54, after "may" and before the comma, insert --be initiated by the associated definable key--.

Signed and Sealed this

Sixth Day of June 1978

[SEAL]

Attest:

RUTH C. MASON
*Attesting Officer*

DONALD W. BANNER
*Commissioner of Patents and Trademarks*